United States Patent
Tavakoli

(10) Patent No.: US 11,313,588 B2
(45) Date of Patent: Apr. 26, 2022

(54) SYSTEM AND METHOD FOR CONTROLLING WATER HEATER OUTPUT TEMPERATURE

(71) Applicant: Camus Hydronics LTD., Mississauga (CA)

(72) Inventor: Payam Tavakoli, Toronto (CA)

(73) Assignee: Camus Hydronics Ltd., Mississauga (CA)

( * ) Notice: Subject to any disclaimer, the term of this patent is extended or adjusted under 35 U.S.C. 154(b) by 0 days.

(21) Appl. No.: 16/608,118

(22) PCT Filed: Sep. 20, 2019

(86) PCT No.: PCT/CA2019/051341
§ 371 (c)(1),
(2) Date: Oct. 24, 2019

(87) PCT Pub. No.: WO2021/051185
PCT Pub. Date: Mar. 25, 2021

(65) Prior Publication Data
US 2021/0095894 A1   Apr. 1, 2021

(51) Int. Cl.
*F24H 9/20* (2022.01)
*G05D 23/00* (2006.01)
(Continued)

(52) U.S. Cl.
CPC ......... *F24H 9/2035* (2013.01); *F24H 9/2028* (2013.01); *G05D 7/0629* (2013.01);
(Continued)

(58) Field of Classification Search
CPC ........... Y10T 137/6497; F24D 19/1021; F24D 19/1024; F24D 2220/042; F24D 2220/044;
(Continued)

(56) References Cited

U.S. PATENT DOCUMENTS

| 5,504,306 A | 4/1996 | Russell et al. |
| 7,712,677 B1 | 5/2010 | Munsterhuis et al. |

(Continued)

FOREIGN PATENT DOCUMENTS

| CA | 2249983 | 1/2005 |
| CA | 3031925 | 3/2018 |

(Continued)

OTHER PUBLICATIONS

PCT/CA2019/051341 International Search Report and Written Opinion of the International Searching Authority dated May 22, 2020 (14 pages).

(Continued)

*Primary Examiner* — Steven S Anderson, II
*Assistant Examiner* — Phillip Decker
(74) *Attorney, Agent, or Firm* — SmithAmundsen LLC

(57) ABSTRACT

A water heater system and method of operating such a system are disclosed herein. In an example embodiment, the water heater system includes a heat exchanger. a heat source inlet by which heated heating fluid can be provided to the heat exchanger, a heat source outlet by which cooled heating fluid can be communicated from the heat exchanger, a water supply inlet by which supply water can be provided to the heat exchanger, and a water supply outlet by which heated water can be communicated from the heat exchanger. Additionally, the system includes a controller, a water supply outlet temperature sensor, a water supply flowmeter, and an actuator. The controller is configured to generate control signals based at least indirectly upon temperature measurements and flow measurements and to provide the control signals to the actuator to regulate a fluid flow of the heated heating fluid into the heat exchanger.

22 Claims, 6 Drawing Sheets

(51) Int. Cl.
*G05D 7/06* (2006.01)
*F24D 19/10* (2006.01)

(52) U.S. Cl.
CPC ......... *G05D 23/00* (2013.01); *F24D 19/1051* (2013.01); *F24D 2220/042* (2013.01); *F24H 9/2021* (2013.01); *Y10T 137/6497* (2015.04)

(58) Field of Classification Search
CPC ... F24D 19/1051; F28F 27/02; F28F 2250/06; G05D 23/00; G05D 7/0629; Y02B 30/70
USPC .......... 165/297–298, 101; 137/337; 219/494, 219/496
See application file for complete search history.

(56) References Cited

U.S. PATENT DOCUMENTS

| | | | |
|---|---|---|---|
| 8,078,333 B2 * | 12/2011 | Kienman | A61M 5/44 700/300 |
| 8,285,129 B2 | 10/2012 | Kim et al. | |
| 8,538,597 B2 | 9/2013 | Beckley et al. | |
| 8,880,227 B2 * | 11/2014 | Mahadeswaraswamy | H01J 37/32522 700/282 |
| 9,599,365 B2 | 3/2017 | Hardesty et al. | |
| 9,664,415 B2 * | 5/2017 | Kishi | F24D 19/1021 |
| 2004/0144528 A1 * | 7/2004 | Kunimoto | F24D 19/1054 165/298 |
| 2006/0231638 A1 * | 10/2006 | Belz | G05D 23/1393 236/12.12 |
| 2012/0192813 A1 * | 8/2012 | Evans | F23N 5/00 122/20 B |
| 2013/0299600 A1 | 11/2013 | Beckers | |
| 2016/0305671 A1 | 10/2016 | Madigan et al. | |
| 2017/0328599 A1 * | 11/2017 | Paine | F24H 9/2028 |
| 2018/0052473 A1 * | 2/2018 | Ward | F24H 9/124 |
| 2018/0073748 A1 | 3/2018 | Gagne | |
| 2018/0073749 A1 | 3/2018 | Gagne | |
| 2018/0163993 A1 | 6/2018 | Goodjohn et al. | |
| 2018/0274792 A1 | 9/2018 | Shaffer | |
| 2020/0200399 A1 * | 6/2020 | Daniels | F24D 17/0026 |

FOREIGN PATENT DOCUMENTS

| | | | |
|---|---|---|---|
| CN | 103148594 | 9/2015 | |
| CN | 106679188 | 5/2017 | |
| DE | 102005041486 | 3/2006 | |
| EP | 1026448 | 8/2000 | |
| FR | 2963087 A1 * | 1/2012 | ......... F24D 19/1012 |
| KR | 101670779 B1 * | 10/2016 | |
| WO | 2009107261 | 9/2009 | |

OTHER PUBLICATIONS

CA3060479 Examination Report dated Feb. 4, 2021 (5 pages).
CA3060479 Response to Canadian Examination Report dated Jun. 4, 2021 (27 pages).
Aerco International, Inc., "SmartPlate Installation, Operation & Maintenance Manual," manual (2017) pp. 1-134, OMM-0069_OG SP-100.
Lochinvar, "Indirect Plate Water Heater Installation & Service Manual," manual (2016) 36 pages, MM #100271422_DIR #2000527669_ Rev B.
Siemens Industry, Inc., "Flowrite 599 Series, Three-Way Valve 2-1/2 to 6-inch Flanged Iron Body," technical Instructions (Jun. 30, 2014) pp. 1-10, Document No. 155-160P25, VF 599-2.
Siemens Industry, Inc., "Flowrite 599 Series, Three-Way Valve 1/2 to 2-inch Bronze Body," technical instructions (Jun. 10, 2014) pp. 1-12, Document No. 155-185P25, VF 599-4.
Siemens Industry, Inc., "Flowrite 599 Series, SKD6xU Electronic Valve Actuators 24 Vac Proportional Control," technical instructions (Jun. 11, 2013) pp. 1-11, Document No. 155-180P25.
Unitronics, "Samba PLC+HMI Installation Guide," brochure (2016) pp. 1-12, DOC17020-A2.
Unitronics, "Samba PLC+HMI Technical Specifications," brochure (2016) pp. 1-6.
Unitronics, "VisiLogic for Vision and Samba," instruction manual (believed to have been available publicly at least as early as May 2018) 991 pages, https://unitronicsplc.com/software-visilogic-for-programmable-controllers/, See Oct. 2021 office action. Examiner considered only pp. 8, 28, 31, 195-200, 344, 400, 469, 481, 482, 484, 485, and 487.
Camus Hydronics Ltd., "Camus DHW Skid," Power Point Presentation by Payam Tavakoli to Sales Representatives at Sales Representatives Meeting of Camus Hydronics (Aug. 2018).
CA3060479 Examination Report dated Oct. 14, 2021 (7 pages).
Response to the Examination Report from the Canadian Patent Office for Application No. 3060479 dated Feb. 14, 2022 (35 pages).

* cited by examiner

SYSTEM AND METHOD FOR CONTROLLING WATER HEATER OUTPUT TEMPERATURE

FIELD

The present technology relates to controlling the temperature of water discharged from a water heater. More specifically, the present technology relates to systems and methods for controlling water heater output temperature when there are fluctuations in the input flow, as well as water heaters employing such systems or methods.

BACKGROUND

Water heaters such as domestic hot water (DHW) heaters are widely implemented in which heat from a heat source, such as a boiler, is transferred by way of a heat exchanger to water output by the water heater. Such water heaters generally have an output setpoint, which defines the desired temperature for the water that is output from the water heater. Typically, water heaters use a proportional-integral-derivative (PID) control loop to make adjustments in the system in an effort to ensure that the outlet water temperature is equal to or near the output setpoint.

The PID control loop typically is a feedback loop that can consist of a temperature sensor located at the outlet, a controller such as a programmable logic controller (PLC), and an actuator located on the boiler side. Based on the outlet temperature reading from the temperature sensor, the controller continuously controls the position of the actuator on the boiler side to regulate the amount of heat that enters into heat exchanger, thereby controlling how much heat is transferred through the heat exchanger to the water supply of the water heater. If the outlet temperature is above the output setpoint, the controller at least partially closes the actuator to reduce the heat coming into the heat exchanger. If the outlet temperature is below the output setpoint, the controller at least partially opens the actuator to increase the heat coming into the heat exchanger.

The PID control loop operates by calculating an error based on a comparison of the measured outlet temperature versus the outlet setpoint. The controller feeds the calculated error to its embedded PID equation, which outputs a control variable that is then scaled and sent to the actuator to either open or close a specific amount in an attempt to minimize the error. The controller keeps executing the loop in an attempt to have the calculated error equal 0, meaning that no correction in signal is sent to the actuator and the actuator remains in its position.

Although such conventional PID control loop control mechanisms can under some operational circumstances be effective in terms of achieving desired levels of control of output water temperature, nevertheless under some operational circumstances such desired control cannot be achieved and the outlet water temperature can vary considerably from the outlet setpoint. More particularly, water heater systems employing conventional control mechanisms may not be able to maintain output water temperature levels at or close to desired setpoints, under sudden domestic water load (flow) changes.

In view of the limitations associated with conventional PID control loop mechanisms employed in hot water heaters, it would be advantageous if a new system or method for controlling water heater temperature output, or new water heater systems employing or utilizing such a new system or method, could be developed.

SUMMARY

The present technology provides systems and methods for controlling water heater output temperature. In at least one example embodiment, the present disclosure relates to a water heater system that includes a heat exchanger, a heat source inlet fluidly connected to the heat exchanger by which heated heating fluid can be provided to the heat exchanger, and a heat source outlet fluidly connected to the heat exchanger by which cooled heating fluid can be communicated from the heat exchanger. Additionally, the water heater system also includes a water supply inlet fluidly connected to the heat exchanger by which supply water can be provided to the heat exchanger, and a water supply outlet fluidly connected to the heat exchanger by which heated water can be communicated from the heat exchanger. Further, the water heater system includes a controller, a water supply outlet temperature sensor operatively connected to the controller and configured to provide to the controller temperature measurements concerning a temperature of the heated water. Also, the water heater system includes a water supply flowmeter operatively connected to the controller and configured to provide to the controller flow measurements concerning a water flow of the supply water or the heated water, and an actuator operatively connected to the controller. The controller is configured to generate control signals based at least indirectly upon the temperature measurements and the flow measurements and to provide the control signals to the actuator to regulate a fluid flow of the heated heating fluid into the heat exchanger.

In at least one additional example embodiment, the present disclosure relates to a method of operating a water heater system using a controller executing a control algorithm. The method includes receiving and storing a temperature setpoint, and receiving a first flow measurement from a water supply flowmeter; receiving a first temperature measurement from a water supply outlet temperature sensor. The method also includes executing a feedback function and generating a feedback output value based at least in part upon the temperature setpoint and the first temperature measurement, and executing a feedforward function and generating a feedforward output value based at least in part upon the first flow measurement. The method further includes combining the feedforward output value and the feedback output value to generate a control signal, and adjusting an actuator based at least indirectly upon the control signal so as to adjust a heat source water flow into a heat exchanger of the water heater system.

Further, in at least one additional example embodiment, the present disclosure relates to a method of operating a water heater system using a controller executing a control algorithm. The method includes receiving a first flow measurement from a water supply inlet flowmeter, and executing a first feedforward function and generating a feedforward output value based at least in part upon the first flow measurement, where the first feedforward function includes a linear function having first and second X-axis endpoints. The method also includes generating a control signal based at least in part upon the first feedforward output value, and adjusting an actuator based at least indirectly upon the control signal so as to adjust a heat source water flow into a heat exchanger of the water heater system. The method further includes determining that an update cycle time has elapsed, and generating an updated feedforward function if the update cycle time has elapsed.

BRIEF DESCRIPTION OF THE DRAWINGS

Specific examples have been chosen for purposes of illustration and description, and are shown in the accompanying drawings, forming a part of the specification.

DETAILED DESCRIPTION

The present inventors have recognized that such conventional water heater systems and control mechanisms (and methods of operation) can fail to achieve desired levels of control over output water temperature particularly when there are fluctuations in the flow rate of water to be heated that is flowing into the water heaters. For example, if the flow rate of the water that flows into the water heater suddenly changes to a significant degree, such as dropping by 50%, the volume of water to be heated by the water heater becomes substantially reduced. In such a circumstance, only a reduced volume of water to be heated is present within the heat exchanger to receive and absorb the heat being transferred from a boiler (or other heat source), and consequently a spike in the output water temperature can occur. Such temperature spikes have been known to result in increases in the output water temperature of as much as 10-15 degrees Fahrenheit.

Although a conventional PID control mechanism will ultimately adjust operation of the water heating system in such a circumstance (e.g., by adjusting the actuator so as to reduce the amount of boiler output water that is provided to the heat exchanger), it will often take significant time for such an adjustment to be made, such that for a period of time there can be a substantial difference between the water heater output water temperature and the outlet temperature setpoint. The present inventors have recognized that such differences between the water heater output water temperature and outlet temperature setpoint can arise particularly because conventional PID control mechanisms solely rely on the temperature measurements from the output water temperature sensors with which those PID control mechanisms are associated, and are unable to determine (or know in advance) or directly account for changes in flow rate that can cause output temperature spikes. The present inventors have recognized this challenge of controlling the output water temperature in cases of sudden flow changes, and have particularly recognized that this challenge can be overcome by implementing, in a new water heater system, an improved control mechanism employing a combination of a PID feedback control loop and a feedforward control algorithm that operates based at least indirectly upon a sensed flow information provided by a flowmeter that detects the water supply into the water heater.

Figure 1:
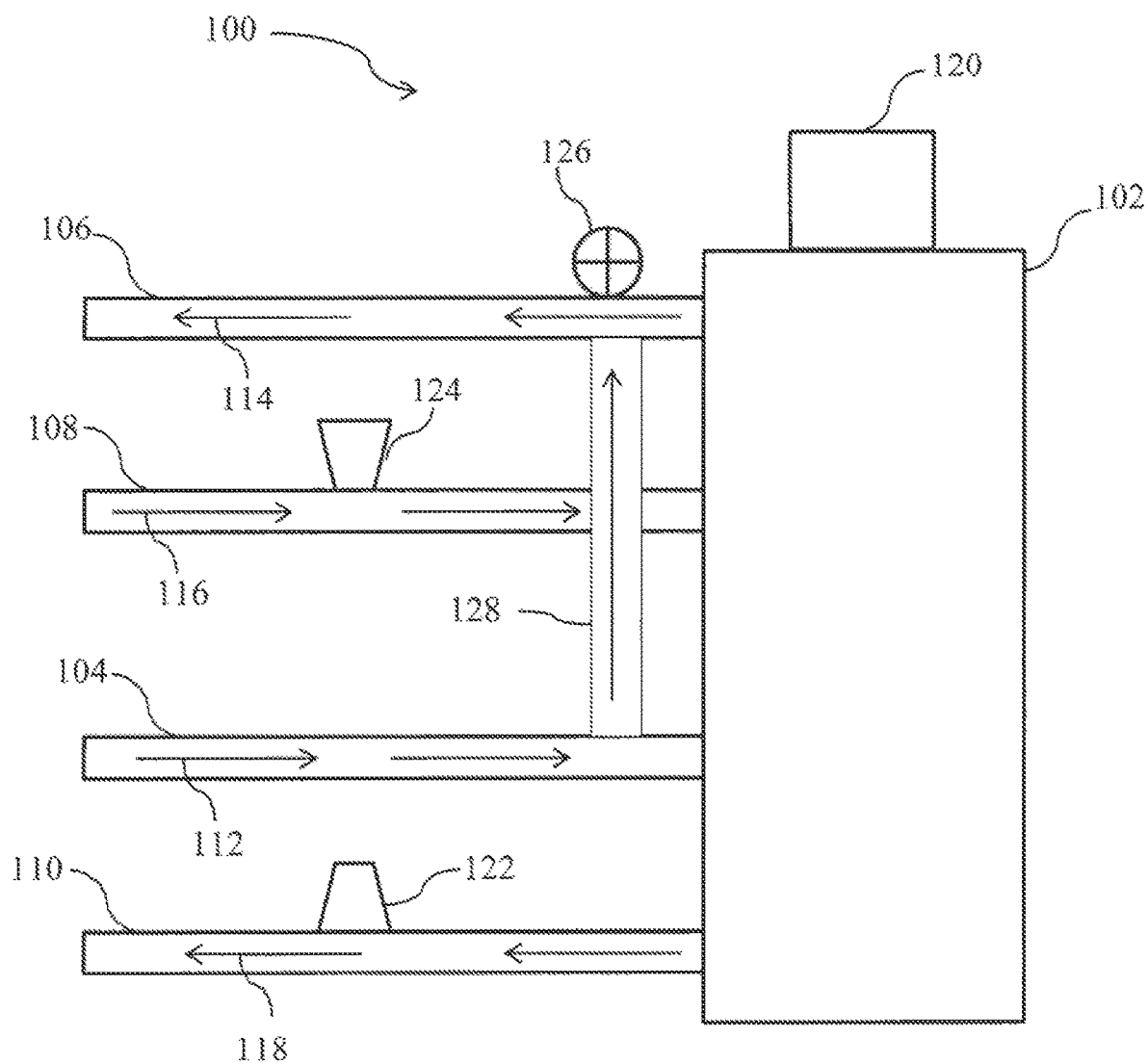
FIG. 1 is a schematic representation of a water heater system in accordance with an example embodiment encompassed herein.

Referring to FIG. 1, a new water heater system 100 employing such an improved control mechanism in accordance with an example embodiment encompassed herein is shown. The water heater system 100 includes a heat exchanger 102. Additionally, the water heater system 100 also includes a boiler inlet 104, a boiler outlet 106, a water supply inlet 108, and a water supply outlet 110, each of which is fluidly connected to the heat exchanger 102 and can take the form of a respective pipe. The boiler inlet 104 provides heated heating fluid 112 from a boiler (not shown) to the heat exchanger 102. The water supply inlet 108 provides supply water 116 to be heated from a water source (not shown) to the heat exchanger 102.

It will be appreciated that the heated heating fluid 112 enters the heat exchanger 102, and provides heat to the supply water 116 introduced into the heat exchanger 102 by way of the water supply inlet 108. By virtue of the transfer of heat from the heated heating fluid 112 to the supply water 116, the heated heating fluid 112 becomes cooled heating fluid 114. The boiler outlet 106 removes the cooled heating fluid 114 from the heat exchanger 102 and directs the cooled heating fluid back to the boiler (again not shown). By contrast, the supply water 116 that receives heat in the heat exchanger 102 becomes heated water 118. The heated water 118 is communicated away from the heat exchanger 102 via the water supply outlet 110. Although not shown, it will be appreciated that the heated water can in turn be directed (e.g., by way of additional pipes) to any of a variety of heated water recipients, such as a sink or a bathtub.

Although not shown in detail, it should be appreciated that the heat exchanger 102 can take any of a variety of forms. In one example form, the boiler inlet 104 and boiler outlet 106 are connected internally with one another within the heat exchanger 102 by way of a first heat transfer pipe (not shown), and the water supply inlet 108 and water supply outlet 110 are connected internally with one another within the heat exchanger by way of a second heat transfer pipe. Each of the first and second heat transfer pipes can run alongside one another or otherwise proximate one another within the heat exchanger 102 so that heat from the heating fluid 112 within the first heat transfer pipe can be transferred to and absorbed by the supply water 116 flowing through the second transfer pipe. To facilitate or enhance the heat transfer within the heat exchanger between the fluids (in this case, the heating fluid 112 and supply water 116, respectively) within the first and second transfer pipes, in some embodiments the first and second transfer pipes pass through heat conductive plates that are pressed together to transfer heat from one fluid to the other while the two fluids are physically isolated from one another (e.g., plate and frame heat exchangers).

Referring still to FIG. 1, the water heater system 100 also includes a controller 120, which is operatively connected to water supply outlet temperature sensor 122, a water supply inlet flowmeter (or sensor) 124, and an actuator 126. As will be described in further detail below, the controller 120 particularly can provide control signals to the actuator 126 and receive monitoring (or sensed information) signals from each of the water supply outlet temperature sensor 122 and the water supply inlet flowmeter 124. Such control signals and monitoring signals can be communicated between the controller 120 and the actuator 126, water supply outlet temperature sensor 122, and water supply inlet flowmeter 124 by way of any of a variety of communication links (not shown) including, for example, wired or wireless communication links. Depending upon the embodiment, the water supply outlet temperature sensor 122 and the water supply inlet flowmeter 124 can each take any of a variety of forms, including the forms of analog or digital sensors or flowmeters.

As shown, the water supply outlet temperature sensor 122 is positioned along the water supply outlet 110 and is configured to sense the temperature of the heated water 118 flowing therewithin, and can send monitoring signals indicative of the sensed temperature information to the controller 120. Also, the water supply inlet flowmeter 124 is positioned along the water supply inlet 108 and is configured to sense the flow (or volumetric flow rate) of the supply water 116 flowing therewithin, and can send monitoring signals indicative of the sensed flow information to the controller 120. Although the water heater system 100 in the present embodiment includes the water supply inlet flowmeter 124 positioned along (or near or proximate to) the water supply inlet 108, it should be appreciated that in alternate embodiments a flowmeter can be positioned at a different location (or even possibly at more than one location) including, for example, along the water supply outlet 110 (in which case, the flowmeter can be referred to as a water supply outlet flowmeter).

In the present example embodiment, the actuator 126 governs the manner in which heating fluid proceeds between the boiler inlet 104 and the boiler outlet 106. Although shown to be physically mounted on the boiler outlet 106, the actuator 126 in alternate embodiments can be mounted on the boiler inlet 104. Based upon control signals received by the actuator 126 from the controller 120, the actuator 126 can take on any of a range of operational positions or settings including, and between, a fully-open position and a fully-closed position. When in the fully-open position, the actuator 126 directs all of the heated heating fluid 112 into the heat exchanger 102. It will be appreciated that, after the heated heating fluid 112 enters the heat exchanger and is cooled therewithin, all of that fluid becomes the cooled heating fluid 114 and exits the heat exchanger via the boiler outlet 106.

In contrast, when the actuator 126 is in the fully-closed position, the actuator directs all of the heated heating fluid 112 into the boiler outlet 106 instead of into the heat exchanger 102, by way of a bypass pipe (or bypass link or simply bypass) 128 (as represented by an arrow shown in the bypass). As shown in FIG. 1, the bypass 128 fluidly connects the boiler inlet 104 and the boiler outlet 106. Thus, when the actuator 126 is in the closed position, the actuator 126 causes all of the heated heating fluid 112 to be diverted to the boiler outlet 106 without passing through the heat exchanger 102. In this circumstance, and given that it is possible that less (or none) of the heat associated with the heated heating fluid 112 will be transferred away from the heated heating fluid when it flows through the bypass 128 rather than through the heat exchanger 102, it should be appreciated that the cooled heating fluid 114 passing through the boiler outlet 106 may actually be the same or substantially the same temperature as the heated heating fluid 112 that enters the boiler inlet 104 and passes through the bypass 128.

Further, the actuator 126 may be adjustable continuously or in increments, which may be continuous or step increments, across its positional range, from its open position to its closed position. When it is closed to some extent, but not fully-closed, the actuator 126 may direct at least a first portion of the heated heating fluid 112 from the boiler inlet 104 to the boiler outlet 106 via the heat exchanger 102 and at least a second portion of the heated heating fluid from the boiler inlet to the boiler outlet via the bypass 128. The actuator 126 is operatively connected to the bypass 128, and the degree to which the actuator 126 is open or closed affects the amounts of heated heating fluid 112 that is directed to the heat exchanger 102 and the bypass 128. The actuator 126 can in some embodiments entail a two-way valve.

Figure 2:
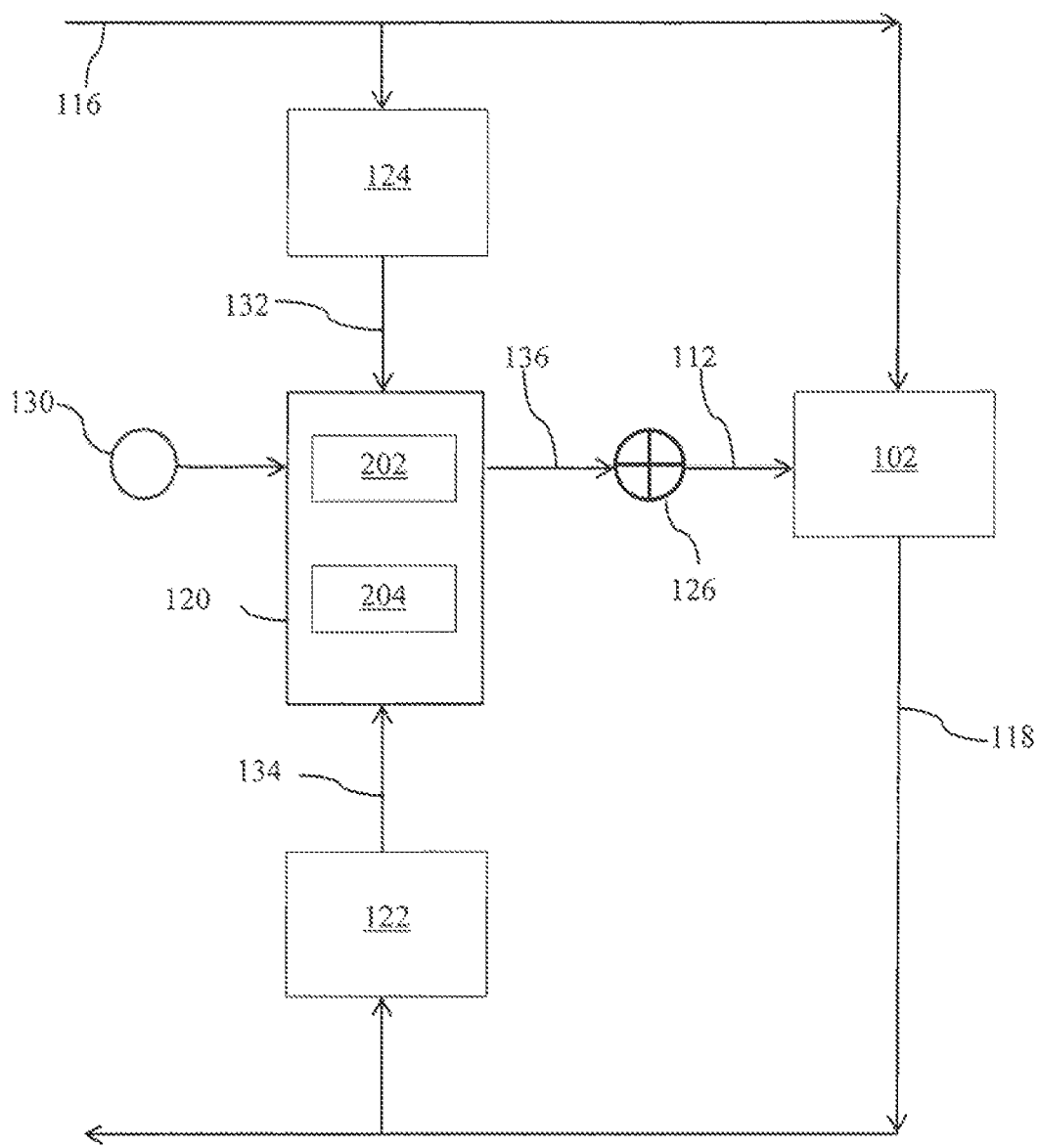
FIG. 2 is a modified signal flow diagram illustrating aspects of a controller of the water heater system of FIG. 1 and how the controller interacts with other components of the water heater system during operation of the water heater system.

Referring additionally to FIG. 2, a modified signal flow diagram is provided to illustrate in more detail aspects of the controller 120 of the water heater system 100 and how the controller 120 interacts with other components of the water heater system during operation of the water heater system. As shown, the controller 120 comprises at least one processor (or central processing unit) 202 and at least one non-volatile memory 204 and, in some embodiments, can take the form of a programmable logic controller (PLC) having a clock or timer. The controller 120 is configured to receive a temperature setpoint 130, and to store the temperature setpoint in the at least one non-volatile memory 204. The controller 120 is also configured to receive and store in the at least one non-volatile memory 204 one or more water supply outlet temperature measurements 134 that are provided in monitoring signals from the water supply outlet temperature sensor 122, and one or more water supply volume flow measurements (which can also be referred to as water supply flow measurements, water supply flow rate measurements, or water supply volume flow rate measurements) 132 that are provided in monitoring signals from the water supply inlet flowmeter 124.

Additionally, the controller 120 further stores in the at least one non-volatile memory 204 at least one control program or algorithm. When the control algorithm is executed by the at least one processor 202 of the controller 120, the controller 120 will generate and send control signals 136 to the actuator 126 to govern the positioning of the actuator 126 based on the temperature setpoint 130, the one or more water supply outlet temperature measurements 134, and the one or more water supply volume flow measurements 132. The water supply outlet temperature sensor 122, which (as illustrated in FIG. 2) senses the temperature of the heated water 118 output from the heat exchanger 102, provides feedback to the controller 120 such that the control mechanism overall for the water heater system 100 includes a feedback loop as described in further detail below. The water supply inlet flowmeter 124, which (as illustrated in FIG. 2) senses the flow rate of the supply water 116, allows for the control mechanism of the water heater system 100 to additionally include a feedforward mechanism (or loop) as also described in further detail below.

As further illustrated by FIG. 2, the actuator 126 may be adjusted, based upon the signals 136 from the controller 120, so as to be opened or closed in order to regulate the amount of heated heating fluid 112 that is provided to the heat exchanger 102. By adjusting the amount of heated heating fluid 112 that is provided to the heat exchanger 102, the actuator 126 governs the amount of heat that is available for transfer to the supply water 116 that is also present in the heat exchanger 102. Based upon the above description regarding FIG. 1, it should be appreciated still from FIG. 2 that, when the actuator 126 is closed by any given amount from the fully-open position, the flow of the heated heating fluid 112 into the heat exchanger 102 is reduced and at least a portion of the heated heating fluid 112 proceeds through the bypass 128 instead of into the heat exchanger 102.

It should be appreciated that the controller 120 can continuously or intermittently (or periodically) execute the control algorithm by way of the processor 202 and can continuously or intermittently (or periodically) send the control signals 136 to the actuator 126. In order to provide updated input to the controller 120 for use in calculating or determining the control signals 136, the water supply flow measurements 132 and the outlet temperature measurements 134 are taken periodically and sent to the controller. The frequency with which the measurements 132 and 134 are taken, and with which calculations are performed by the controller 120, can vary depending upon the embodiment or design (e.g., depending upon the choice of hardware (PLC) and/or control program or logic implemented thereon). For example, measurements and calculations may occur at least once per second, or multiple times per second, or once every few seconds.

As described in further detail below, the control algorithm performed by the processor 202 in the water heater system 100 of the present embodiment includes a first component including a feedback function that calculates a feedback output based on the temperature setpoint 130 and the one or more outlet temperature measurements 134. The feedback function can include a PID equation, which may, for example, be in the standard or parallel, independent or ISA (International Society of Automation) form. Additionally, the control algorithm performed by the processor 202 in the water heater system 100 of the present embodiment includes a second component with a feedforward function that calculates a feedforward output based upon the one or more water supply flow measurements 132.

FIG. 2 illustrates how operation of the feedback and feedforward loops can be achieved and utilized by the controller 120 to control the actuator 126. As illustrated, the controller 120 receives and stores a temperature setpoint 130. The water supply inlet flowmeter 124 takes one or more of the water supply flow measurements 132 of the supply water 116 and communicates the water supply flow measurement(s) 132 to the controller 120. The water supply outlet temperature sensor 122 takes an outlet temperature measurement 134 from the heated water 118 exiting the heat exchanger 102 and provides the outlet temperature measurement 134 to the controller 120. The controller 120 receives the water supply flow measurement 132 and the outlet temperature measurement 134.

The controller 120 is configured to execute a control algorithm that calculates a control variable (or "CV") based on the temperature setpoint 130, the water supply flow measurement 132, and the outlet temperature measurement 134, in accordance with a feedback function and feedforward function as mentioned above. To the extent that a feedback function employing a PID equation is employed, calculation of the control variable can include calculation of the proportional, integral, and derivative parameters or terms (P, I, and D) associated with the PID equation. As shown in FIG. 2, the controller 120 sends a control signal 136 based on the control variable to the actuator 126, which adjusts the actuator 126 by causing it to open or close by a set amount (or to stay at its current fully-open, partly-open/partly-close, or fully-closed position). The actuator 126 receives the control signal 136 and responds by opening or closing by the set amount. While examples discussed herein refer to the set amount in terms of percentages, it should be understood that the set amount may be expressed in the form of alternative suitable variables, such as distance or area.

As will be described in further detail below, the feedback and feedforward aspects of the control algorithm particularly enable the controller 120 to advantageously determine the control signal 136 and adjust the actuator 126 in certain contexts. The control algorithm can be configured such that the feedback output generated by the feedback function (which again itself can be configured by the parameters P, I, and D) serves as a primary (or significant) basis upon which the controller 120 adjusts the actuator 126 when the flow of the supply water 116 is constant. Further, the control algorithm can also be configured such that feedforward output generated by the feedforward function serves as a secondary (less dominant) basis upon which the controller 120 adjusts the actuator 126 when the flow of the supply water 116 varies. In the present embodiment, the degree to which the controller 120 adjusts the actuator 126 based on the feedforward output can depend on the variations in flow. In particular, if flow varies significantly within a short period of time, the feedforward output will have a more significant effect, even though the effect of the feedforward output will still be secondary relative to the effect of the feedback output generated by the feedback function.

Figure 3:
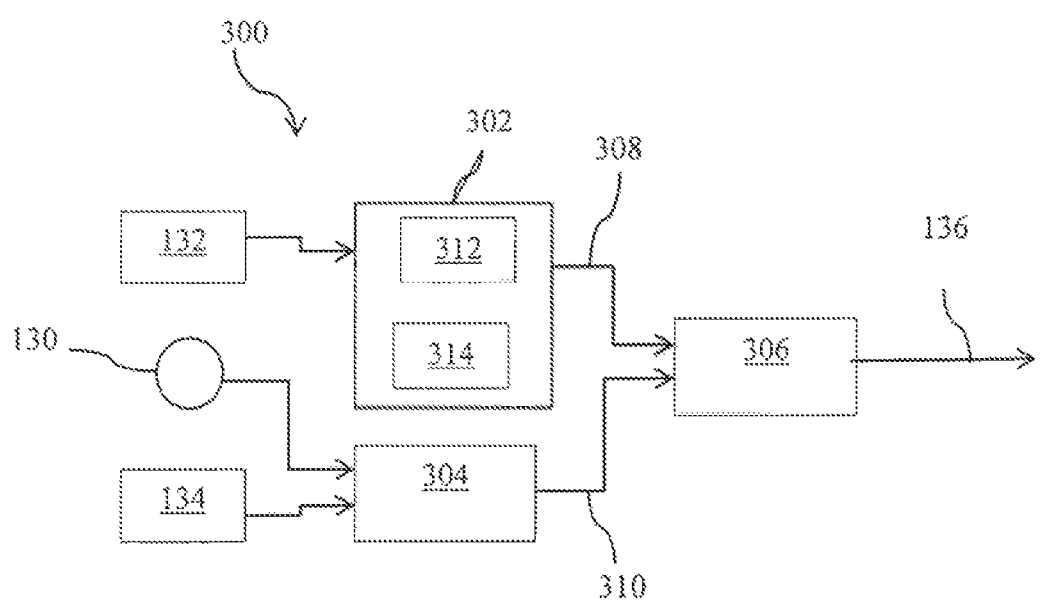
FIG. 3 illustrates one example of a controller configured to execute a control algorithm of the present technology.

Turning to FIG. 3, a schematic diagram 300 is provided to illustrate components or modules (or corresponding subprocesses) of the controller 120 by which both the feedback function and the feedforward function described above can be achieved. These respective modules can also respectively be considered to be representative of respective subprocesses of an overall process that is performed by the controller 120 when the control algorithm or program described above is executed by the processor 202 of the controller 120. As shown in FIG. 3, the controller 120 particularly can be understood to include at least a first module 302, a second module 304, and a third module 306.

The first module 302 of the controller 120 serves to execute the feedforward function and calculates a feedforward output 308 based upon the one or more water supply flow measurements 132. In contrast, the module 304 of the controller 120 executes a PID feedback function and calculates a feedback output 310 based on the temperature setpoint 130 and the one or more outlet temperature measurements 134, as well as the proportional, integral and derivative (P, 1, and D) parameters. The functions of modules 302 and 304 can be performed partly or entirely simultaneously or in succession, and are generally performed on a repeated or ongoing basis. At the third module 306, the controller 120 combines the feedforward output 308 and the feedback output 310 and generates the control signal 136. Again, the function of the module 306 can be performed on a repeated or ongoing basis.

In this example, the feedback output 310 may be scaled to adjust the actuator 126 by any amount, plus or minus, over the full positional range of the actuator, such as from 0% to 100% of that range (where 0% is fully closed and 100% is fully open). That is, assuming that the feedforward output 308 is zero and provides no contribution to the control signal 136 as generated by the third module 306, the control signal 136 can range fully between a 0% value and a 100% value and correspondingly cause the actuator 126 to vary in its position anywhere between its fully closed position and its fully open position based upon the feedback output 310.

In contrast, the feedforward output 308 may be scaled to adjust the actuator 126 by up to only a portion of the positional range of the actuator. More particularly, the first module 302 can be configured to generate the feedforward output 308 in a manner so that it only takes on values at or in between fixed maximum positive and maximum negative values that re (or correspond to) less than the full positional range of the actuator 126. For example, the fixed maximum positive and negative values of the feedforward output 308 may be plus or minus about 20%, or about 30%, of the full positional range of the actuator 126. Accordingly, the control algorithm according to which the controller 120 operates is configured such that the feedforward output generated by the first module 302 affects the control signal 136, and thus the adjustment of the actuator 126, by a smaller amount than the feedback output generated by the second module 304.

The first module 302 in some embodiments can further be configured to implement the feedforward function so that the feedforward output 308 only increases or decreases to or towards its maximum value or minimum value if the flow of the initial water supply changes rapidly by a significant amount. Correspondingly, if the initial water supply flow has a stabilized period, without changes during that time, the feedforward output 308 can be zero (0) during that stabilized period.

Figure 4:
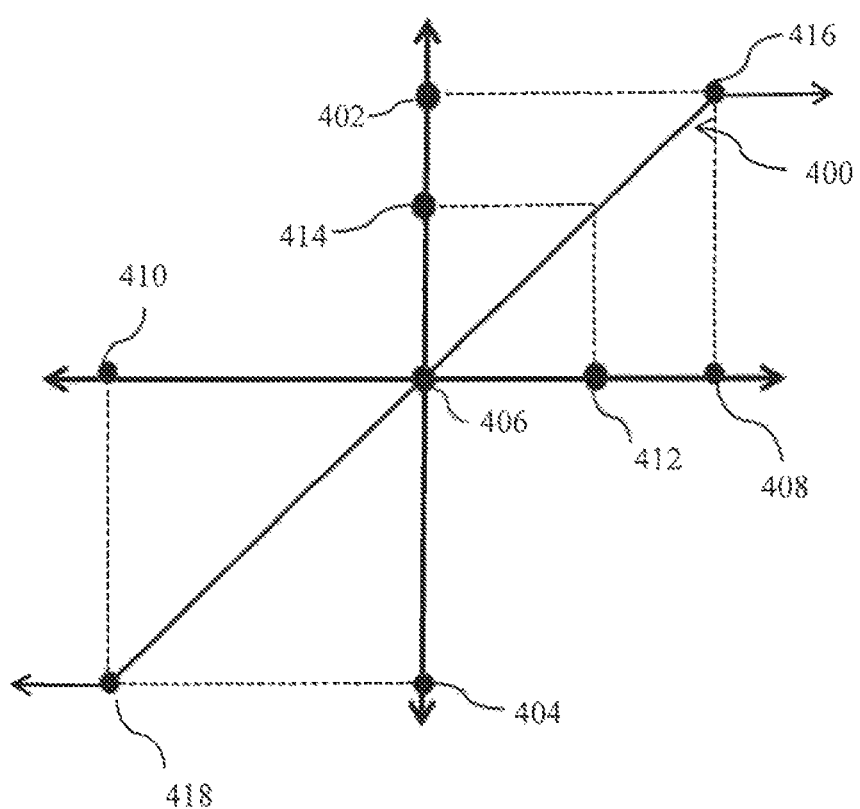
FIGS. 4 and 6 are a graphic illustrations of examples of feedforward functions of the present technology.

FIG. 4 is a graph showing one example of a feedforward function 400 that is implemented by the controller 120 (particularly the first module 302 thereof) at a given point in time in accordance with one example embodiment encompassed herein. In the present embodiment, the feedforward function 400 generally is a linear line graph showing how the feedforward output 308 (and/or corresponding actuator adjustment) varies based upon the one or more supply flow measurements 132 (that is, based upon the sensed flow of the supply water 116) as detected by the water supply inlet flowmeter 124. More particularly, the X-axis of the graph in FIG. 4 represents the flow rate in gallons per minute (GPM) of the supply water 116 passing through the water supply inlet 108, as detected by the water supply inlet flowmeter 124. Further, the Y-axis of the graph represents a feedforward output value range. It should additionally be appreciated that, although the first module 302 can generate the feedforward output 308 in view of the sensed flow of the supply water 116 in accordance with the feedforward function 400 at a given time, the feedforward function can be adjusted as time passes, as further discussed below.

As shown, the origin or intersection point of the graph at which the X-axis intersects the Y-axis, and through which the feedforward function 400 passes, is not a zero value of the X-axis but rather is an average flow rate 406 based on one or more previous water supply volume flow measurements. Additionally, the graph shows endpoints 408 and 410 of the X-axis, which can be set at +50% of the average flow rate 406 and −50% of the average flow rate, respectively. For example, if the average flow rate 406 is assumed to be 60 GPM, then the endpoints 408 and 410 can respectively be 30 GPM and 90 GPM (that is, 60+/−(60/2) GPM). The endpoints 402 and 404 of the Y-axis respectively are the fixed maximum positive and negative output values that can be generated in accordance with the feedforward function 400, respectively. Additionally, while the endpoints 408 and 410 of the X-axis are calculated based on the average flow rate 406, an intermediate X value 412 (along the X-axis, between the endpoints 408 and 410) illustrated in FIG. 4 is also shown as an example of an X value that corresponds to one of the (instantaneous) water supply volume flow rate measurements 132 of the supply water 116 taken by the water supply inlet flowmeter 124, and that can serve as an input to the feedforward (line equation) function 400.

As already noted, the feedforward function 400 in this example is a linear function based on the feedforward output range and the water supply flow rate range established by endpoints 408 and 410. First and second endpoints 416 and 418 of the feedforward function 400 correspond respectively to the coordinates indicating the maximum X-axis endpoint 408 and Y-axis endpoint 402, and the minimum X-axis endpoint 410 and Y-axis endpoint 404, respectively. The maximum value of the feedforward function 400 at the first endpoint 416 occurs when there is a maximum difference in the positive X-axis direction between the most recent flow measurement 132, and the average flow rate 406 (that is based on one or more previous volume flow measurements), and the minimum value of the feedforward function 400 at the second endpoint 418 occurs when there is a maximum difference in the negative X-axis direction between the most recent flow measurement 132, and the average flow rate 406 (that is based on one or more previous volume flow measurements.)

The X-axis endpoints 408, 410 are not truly end points in the sense of being absolute maximum or minimum possible levels of flow that can be sensed by the flowmeter 124, but rather are maximum or minimum levels of flow at which maximum or minimum immediate adjustments in the feedforward output 308 can be generated, and thus can cause immediate adjustments in the control signal 136 and positioning of the actuator 126 to the maximum or minimum extent. Accordingly, the endpoints 416 and 418 of the feedforward function 400 are not true endpoints, but rather points at which the feedforward function flattens out. If the instantaneous variation in the sensed water supply volume flow is outside of the range defined by the X-axis endpoints 408 and 410, the Y-axis values determined by the feedforward function 400 will correspond to one of the Y-axis endpoints 402 or 404. That is, if the sensed water supply volume flow within a short period of time varies so as to exceed the endpoint 408, the feedforward function 400 will at most generate the feedforward output value associated with the endpoint 402. Likewise, if the sensed water supply volume flow within a short period of time varies so as be less than the endpoint 410, the feedforward output value generated by the feedforward function 400 still will not fall below that associated with the endpoint 404.

Further as illustrated by FIG. 4, therefore, in operation, a current water supply flow rate (or flow rate measurement or volume flow rate measurement) as represented by the intermediate X-value 412 (as one example) can be input into the feedforward function 400, and then a corresponding feedforward output value 414 (again as one example) can be determined by the first module 302 of the controller 120 as the feedforward output 308, based upon that current water supply flow rate. The current water supply flow rate (in this example, represented by the intermediate X-value 412) corresponds to the most recent water supply volume flow measurement taken by the water supply inlet flowmeter 124, and the X-axis endpoints 408 and 410 are determined based on the average flow rate 406 of previous water supply volume flow measurements 132. As previously mentioned, if the water supply flow rate changes by 50% or more above or below the average flow rate 406, then the feedforward output will reach its maximum value or minimal value.

Referring still to FIG. 3, in the present embodiment the feedforward output 308 generated by the first module 302 not only takes into account the currently-sensed flow rate of the supply water 116 but also takes into account the average flow rate over a period of time. The average flow rate is used to determine the X-axis endpoints 408 and 410, and the first module 302 of the controller 120 updates the feedforward function 400 based on newly-determined values of the X-axis endpoints 408 and 410 periodically. Each time, after the feedforward function 400 is updated, the first module 302 then proceeds to employ that updated version of the feedforward function in generating the feedforward output 308 going forward until the feedforward function is updated yet again.

In the present embodiment, updating of the feedforward function 400 is accomplished by way of a filter 312 and an update limiter 314, which are shown in FIG. 3 and can be considered parts of (or submodules of) the first module 302. As already noted above, the origin of the graph through which the feedforward function 400 passes is at an X-axis value equaling the average flow rate 406 of the supply water 116 based on one or more of the water supply volume flow measurements 132. Likewise, the X-axis endpoints 408 and 410—and thus (in other words) the slope and the Y-intercept of the feedforward function 400—are based on the average flow rate 406. Each time the average flow rate 406 and the X-axis endpoints 408 and 410 are updated, the feedforward function 400 is also updated and particularly can have a new (updated) slope and/or a new (updated) Y-intercept, albeit the slope and Y-intercept need not always vary each time there is an update of the average flow rate 406 or X-axis endpoints 408, 410. That is, whenever the average flow rate 406 is modified due to an update, any one or more of the location at which the feedforward function 400 crosses the X-axis, the X-axis endpoints, the slope, and the Y-intercept of the feedforward function can be changed accordingly, as described further below.

More particularly, in the present example embodiment, the filter 312 is configured to receive and store a predetermined number of water supply volume flow measurements 132 from the water supply inlet flowmeter 124. The predetermined number of the water supply volume flow measurements 132 in the present embodiment is sixteen (16) measurements albeit, in alternate embodiments, the predetermined number can be any number, such as 5, 6, 10, 12, 15, 20, or any other suitable number.

Also, in the present embodiment the filter 312 is a FIFO (First in First Out) filter that removes the oldest one of the water supply volume flow measurements 132 from being stored in the filter when a new one of the water supply volume flow measurements is received. New ones of the water supply volume flow measurements 132 can be entered into the filter 312 (and can replace earlier ones of the measurements) periodically, at each update cycle of the feedforward function 400 or on a more frequent basis. For example, new ones of the water supply volume flow measurements 132 can be entered into the filter 312, and the feedforward function 400 can then be updated, at the end of each update cycle. Each update cycle may occur after a preset time period, such as every fifteen (15) seconds. At every update cycle, the controller 120 calculates the average flow rate based on the predetermined number of water supply volume flow measurements stored in the filter 312 at that time and then, upon the average flow rate being calculated, the X-axis endpoints 408 and 410 are additionally calculated and the feedforward function 400 is updated accordingly.

As already mentioned, in the present embodiment, the feedforward function 400 can be updated by the controller 120 on a periodic basis, at the end of each update cycle. Each update cycle also can be referred to as an increment. At each increment, the average flow rate 406 can be recalculated and can vary, and accordingly the location at which the feedforward function 400 crosses the X-axis can vary. Additionally at each increment, the endpoints 408 and 410 of the X-axis range of the feedforward function 400, and the slope and the Y-intercept of the feedforward function 400, can also be altered relative to their previous values.

More particularly, in the present embodiment, the endpoints 408 and 410 respectively are determined at each increment based upon the most recently updated value of the average flow rate 406, and additionally based upon the influence of the update limiter 314. If one ignored the role of the update limiter 314 (e.g., if one supposed that the update limiter 314 was not present or active), the endpoints 408 and 410 of the X-axis range of the feedforward function 400 at each increment would respectively be set simply to equal the most recently updated value of the average flow rate 406, plus or minus one-half (112) of that average flow rate. For example, if the average flow rate 406 when updated changed from 60 GPM to 66 GPM, then the updated values of the endpoints 408 and 410 would respectively be 66+(66/2)=99 GPM and 66−(66/2)=33 GPM, respectively.

Notwithstanding such operation if the update limiter 314 was not present, in the present embodiment the update limiter 314 is present and can operate to limit the amount(s) by which the endpoints 408 and 410 of the X-axis range are altered at each increment. Depending upon the embodiment or implementation, the update limiter 314 can prevent the values of the X-axis endpoints 408 and 410 from being altered at a given increment by more than a real number limit amount or by more than an integer limit amount, compared to the values of those endpoints at the previous increment. For example, in some example embodiments, the update limiter 314 can prevent the values of the X-axis endpoints 408 and 410 from being altered by more than 5 GPM, 2 GPM, or 1 GPM per increment, and can limit changes to one or both of the endpoints to changes within those limits.

Further for example, suppose that the update limiter 314 is set to limit changes to the endpoints 408, 410 at a given increment to a 2 GPM integer limit amount, and additionally suppose that, at the previous increment, the value of the average flow rate 406 was determined to be 60 GPM and the endpoints 408 and 410 were respectively set to 90 GPM and 30 GPM. In such a circumstance, even if the average flow rate 406 when updated at the current increment changes from 60 GPM to 66 GPM as indicated above, the values of the endpoints 408 and 410 will not be updated to take on the aforementioned values of 99 GPM and 33 GPM, respectively. Rather, under the influence of the update limiter 314, instead the endpoints 408 and 410 will respectively be limited to taking on values of 92 GPM (90 GPM plus the 2 GPM integer limit amount) and 32 GPM (30 GPM plus the 2 GPM integer limit amount), respectively.

Regardless of whether the update limiter 314 restricts changes to the endpoints 408 and 410 at each increment, it should additionally be appreciated that the feedforward function 400 after each update in the present embodiment is to take the form of a straight line extending between a maximum feedforward output value having a Y-axis value corresponding to that of the endpoint 402, at a X-axis value corresponding to that of the endpoint 408, and a minimum feedforward output value having a Y-axis value corresponding to that of the endpoint 404, at a X-axis value corresponding to that of the endpoint 410. It will further be appreciated that, if the average flow rate 406 increases or decreases, such that one or both of the endpoints 408, 410 vary in their location(s) along the X-axis, the magnitude of the difference between the endpoints 408 and 410 along the X-axis can vary, such that the slope and the Y-intercept of the line of the feedforward function 400 can change.

Additionally, it should also be recognized that, if the update limiter 314 restricts changes to the endpoints 408 and 410, the update limiter 314 can also operate to adjust the feedforward function 400 so that it crosses the X-axis at a location other than at the average flow rate 406. In the present embodiment, regardless of whether the update limiter 314 restricts changes to the endpoints 408 and 410, the feedforward function 400 is determined to take the form of a straight line extending between the maximum feedforward output value having a Y-axis value corresponding to that of the endpoint 402, at a X-axis value corresponding to that of the endpoint 408, and a minimum feedforward output value having a Y-axis value corresponding to that of the endpoint 404, at a X-axis value corresponding to that of the endpoint 410. To maintain this linear form of the feedforward function 400 when restricting changes to the endpoints 408 and 410, the update limiter 314 also operates to modify the location at which the feedforward function crosses the X-axis away from the updated value of the average flow rate 406.

Further with respect to the updating of the feedforward function 400, it should be recognized that, in at least some embodiments or implementations including the present embodiment, the sampling rate of the update cycle of the feedforward function 400 differs from the sampling rate (or sampling rates) of the water supply outlet temperature sensor 122 and the water supply inlet flowmeter 124. For example, in the present example embodiment, the sampling rates of the water supply outlet temperature sensor 122 and the water supply inlet flowmeter 124 can be the same and can involve taking samples multiple times per second. However, the update cycle for the feedforward function 400 can occur less frequently, such as once every few seconds (e.g., every 15 seconds as mentioned above). Further for example with reference to FIG. 4, it should be appreciated that in the present embodiment the X-axis endpoints 408 and 410 (and/or correspondingly the slope and the Y-intercept of feedforward function 400) will be updated at a first frequency that is lower than a second frequency (e.g., multiple times per second) at which successive X values such as the intermediate X value 412 (corresponding to successive ones of the water supply volume flow measurements 132) are inserted into the feedforward function 400 (which can be anywhere on the X-axis) and at which output values of the feedforward function 400 are calculated.

Also it should be understood that, in the present embodiment, the overall control algorithm can be executed by the controller 120 at a rate that is equal to the sampling rate of the water supply outlet temperature sensor 122 and the water supply inlet flowmeter 124. Each time the control algorithm is executed at that sampling rate, a new one of the water supply flow measurements 132 can be obtained (in other words, the water supply flow measurement is updated). Additionally, at each execution of the control algorithm, the current (most recently updated) version of the feedforward function 400 as well as the most recent one of the water supply flow measurements 132 are used by the controller 120 to generate the feedforward output 308 and the control signal 136. Thus, the controller 120 particularly can generate updated values of the control signal 136 and cause adjustments of the position of the actuator 126 at that sampling rate, each time the overall control algorithm is executed. Further, at each update cycle (which as noted above in this embodiment occurs on a less frequent basis than the aforementioned sampling rate), the feedforward function 400 can be updated. If such updating occurs, the controller 120 will then use the updated version of the feedforward function 400 for each execution of the control algorithm that occurs up until the next update cycle. As a result, in the present embodiment, even though the X-axis endpoints, slope, and Y-intercept of the feedforward function 400 can update once every few seconds, the output (Y value) of the feedforward function 400 itself is calculated at such a high frequency as to be effectively or substantially continuous, based upon the effectively (or substantially) continuous updating of water supply flow measurements 132 serving as the input (X value) of the feedforward function 400.

Figure 5:
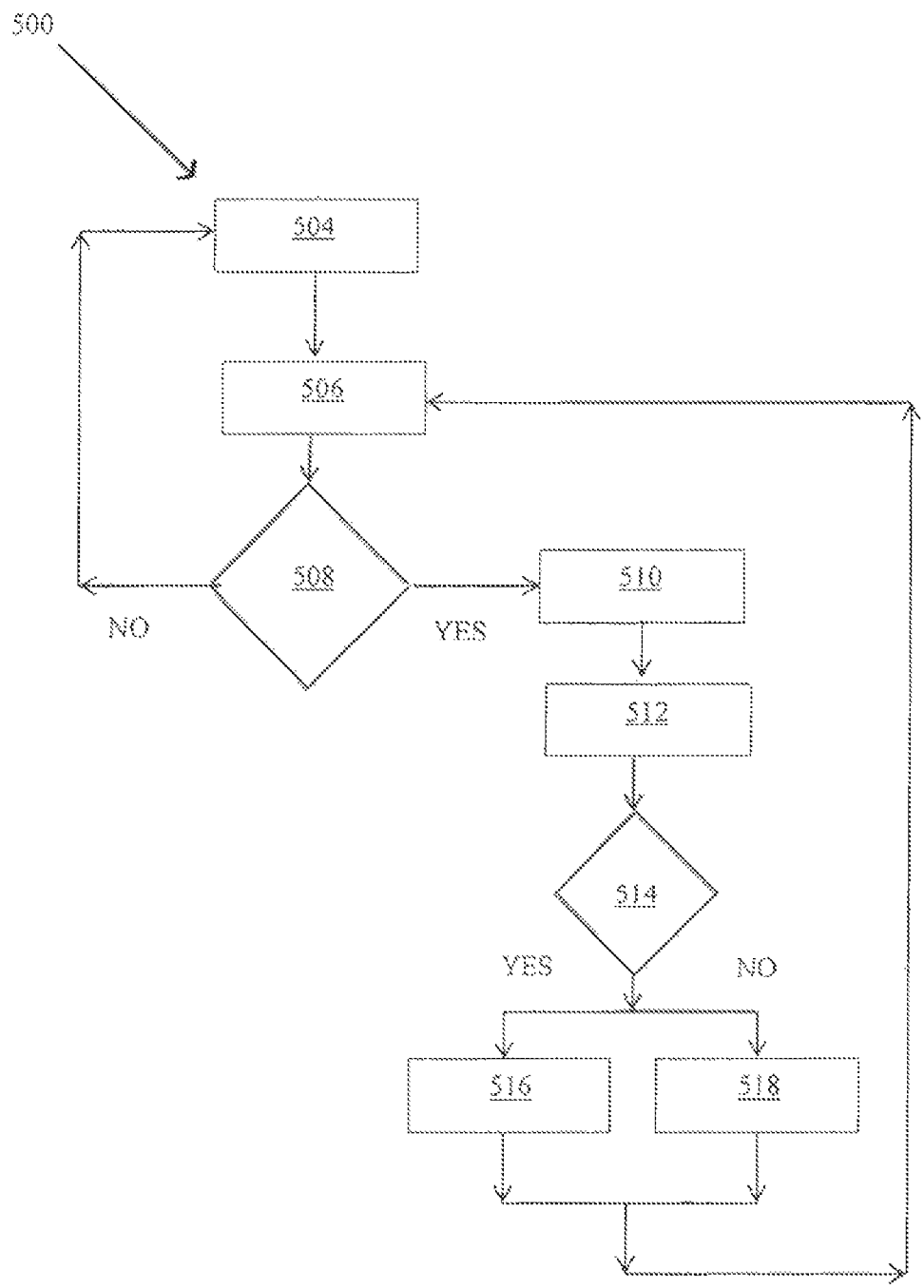
FIG. 5 is a flow chart showing one example of a method of operation of a controller using a feedforward function of the present technology.

Turning now to FIG. 5, a flow chart is provided to show one example process or method 500 that can be employed by the controller 120 when executing and updating a feedforward function such as the feedforward function 400 described above. Upon commencement of the process, at a step 504, the controller 120 receives a water supply volume flow measurement (e.g., such as the water supply volume flow measurement 132) from the water supply inlet flowmeter 124.

Further, at a step 506, the controller 120 executes a first feedforward function (such as the feedforward function 400) and uses the current (most recent) one of the water supply flow measurements 132 to generate a feedforward output (such as the feedforward output 308). Based upon the feedforward output that is generated, the controller 120 can provide a control signal (such as the control signal 136) and cause adjustment of the actuator 126 (this activity also can be considered to occur at the step 506). In the present embodiment, the first feedforward function includes a linear function having first and second X-axis endpoints (such as the endpoints 408 and 410). At a step 508, the controller 120 additionally determines whether the update cycle time has elapsed. If it has not, the determination is "No," and the method returns to the step 504, which entails obtaining a new (or updated) one of the water supply flow measurements 132 (which may or may not have the same value as the water supply flow measurement 132 corresponding to the previous execution of the step 504). If the update cycle time has elapsed, the determination is "Yes," then the method proceeds to a step 510. It should be appreciated from the above discussion and the additional discussion below that, in the present embodiment, the feedforward function 400 is updated periodically, and also the steps 504 and 506 involving obtaining water supply flow measurements and execution of the feedforward function are performed repeatedly, at a higher frequency than that of the updating of the feedforward function. Further, it should additionally be appreciated that, although at the initial performance of the step 506 it is the first (initial) version of the first feedforward function that is executed at that step, at subsequent performances of the step 506 it can continue to be the first version of the feedforward function that is executed if the feedforward function has not yet been updated (e.g., where the X-axis endpoints such as the endpoints 408 and 410 have not yet been updated) or alternatively it can be a most recently-updated version of the feedforward function that is executed if updating ha occurred, to calculate the feedforward output based upon the most recently-sensed (new) one of water supply flow measurements obtained during the most recent performance of the step 504.

If the method proceeds to the step 510 because the update cycle time has elapsed, the controller 120 enters the water supply volume flow measurement obtained at the step 504 into a filter (such as the filter 312) and calculates by way of the filter an average flow rate (such as the average flow rate 406). As described above, the filter can be a FIFO filter that takes into the most recently obtained water supply flow measurement but no longer takes into account the previously-oldest water supply flow measurement in arriving at the average flow rate. In some embodiments, multiple new water supply volume flow measurements obtained by the flowmeter 124 (e.g., due to repeated performances of the step 504 after the operation of the method began or after a previous update cycle time elapsed) can be entered into and utilized by the filter in performing the step 510. Next, at a step 512, the controller 120 divides the average flow rate determined at the step 510 by two (2) to obtain a 50% value of the average flow rate. Additionally, at the step 512, the 50% value is added to and subtracted from that average flow rate to obtain third and fourth X-axis endpoints.

Next, at a step 514, the controller 120 applies an update limiter (such as the update limiter 314) to determine the respective differences between the respective third and fourth X-axis endpoints and the first and second X-axis endpoints, respectively, of the current feedforward function. As already mentioned above, in the present embodiment the updating of the feedforward function occurs periodically and consequently the step 514 is performed repeatedly (as are the previously-mentioned steps 508, 510, and 512). If this is the first time at which updating of the feedforward function is occurring (e.g., the first time at which the step 514 is being performed), or if the current version of the feedforward function remains the first (initial) version of the feedforward function notwithstanding the elapsing of one or more update cycles in the past (e.g., because no updating was necessary), then the determination made at the step 514 can be between the respective third and fourth X-axis endpoints and the respective first and second X-axis endpoints of the first (initial) version of the feedforward function. Alternatively, if the current version of the feedforward function is an updated version of the feedforward function that differs from the first (initial) version of the feedforward function because of updating of the feedforward function that has already occurred, then the determination made at the step 514 can be between the respective third and fourth X-axis endpoints determined at the step 512 and alternate (updated) first and second X-axis endpoints of the current, most recently-updated version of the feedforward function.

More particularly, at the step 514, the update limiter determines whether both of the respective differences between the third X-axis endpoint and the first X-axis endpoint, and between fourth X-axis endpoint and the second X-axis endpoint, are less than or equal to a limit amount (e.g., a 2 GPM integer limit amount as described above). If both of the respective differences are less than or equal to the limit amount (a "Yes" scenario as shown in FIG. 5), then the method proceeds from the step 514 to a step 516, at which an updated feedforward function is generated based on the average flow rate and the third and fourth X-axis endpoints determined at the step 512. The updated feedforward function can, as discussed above, have a different slope and Y-intercept than the first feedforward function. However, if one or both of the respective differences is greater than the limit amount (a "No" scenario as shown in FIG. 5), the method advances from the step 514 to a step 518.

At the step 518, the update limiter particularly operates to generate one or two alternative (or modified) third and fourth X-axis endpoints that take into account the limit amount. More particularly, if one of the differences between the respective third and fourth X-axis endpoints determined at the step 512 and the respective first and second X-axis endpoints is in excess of the limit amount, then at the step 518 that one of those third and fourth X-axis endpoints is changed to an alternative third or fourth X-axis endpoint that only differs from the corresponding first or second X-axis endpoint by the limit amount. Alternatively, if both of the differences between the respective third and fourth X-axis endpoints determined at the step 512 and the respective first and second X-axis endpoints are in excess of the limit amount, then at the step 518 both of those third and fourth X-axis endpoints are respectively changed to alternative third and fourth X-axis endpoints, respectively, each of which differs from the corresponding first and second X-axis endpoint by the limit amount. Additionally at the step 518, the update limiter further operates to generate an overall updated feedforward function that takes into account the alternative third and/or fourth X-axis endpoints. This can involve adjusting the slope and the Y-intercept and positioning of the line constituting the feedforward function, so as to extend directly (linearly) between the alternative third and/or fourth X-axis endpoints. Due to such adjustment, the midpoint of the feedforward function may no longer correspond to the average flow rate calculated at the step 510. In the present embodiment, the updated feedforward function will still extend between maximum and minimum levels of feedforward output (e.g., +/−30%) that are the same as those of the first feedforward function. However, this need not be the case in other embodiments. To the contrary, in at least some other embodiments, the maximum and/or minimum levels of feedforward output achievable via the feedforward function can vary during operation or the control algorithm.

Regardless of whether the updated feedforward function is determined at the step 516 or the step 518, upon completion of either of the steps 516 and 518, the controller 120 replaces the first feedforward function with the updated feedforward function. After this has been performed, the method can return to the step 506, at which the controller 120 executes the updated feedforward function and generates feedforward output based upon the updated feedforward function and the most recently-obtained one of the water supply volume flow measurements 132 so as to control the actuator 126. Although FIG. 5 shows the method as proceeding from either the step 516 or the step 518 to the step 506, in an alternate embodiment the method can instead proceed from either the step 516 or the step 518 to the step 504, at which time an additional one of the water supply volume flow measurements 132 could be obtained for use during subsequent performance of the step 506. Additionally, although FIG. 5 shows the method as proceeding from the step 504 to the step 506 and then subsequently to the step 508, in another alternate embodiment the method can instead advance from the step 504 to the step 508 and then, depending upon whether a "No" result or a "Yes" result respectively is determined at the step 508, proceed either to the step 506 or to the step 510 respectively depending upon that determination (in such alternate embodiment, after performing the step 506, the method would return to the step 504).

Notwithstanding the above description, the present disclosure is intended to encompass any of a variety of further embodiments and implementations, and methods and manners of operation, in addition to those described above. The methods of operation encompassed herein can vary not only depending upon the embodiments or implementations, but also in view of the circumstances of operation. Two additional examples of embodiments and methods of operation encompassed herein are described in further detail below:

Example 1

A water heater system as described above with reference to FIGS. 1-2 was provided. At start-up, the volume flow rate of the supply water 116 through the water supply inlet 108 was 60 GPM. The temperature setpoint was 140° F. The system was allowed to stabilize, then the volume flow rate of the supply water 116 through the water supply inlet 108 was reduced by 50%, down to 30 GPM over a few seconds.

Based on the operation of the controller 120, the outlet temperature did not vary by more than 2° F.

Example 2

A water heater system as described above with reference to FIGS. 1-3 was provided. The system was configured with a FIFO filter that stored 16 water supply volume flow rate measurements at any given time. The update cycle time was set at 15 seconds, such that the filter was updated with a new water supply volume flow rate measurement and calculated a new average volume flow rate every 15 seconds, which was then used to update the feedforward function. The maximum positive and negative values for the feedforward output were set at plus and minus 30%.

Figure 6:
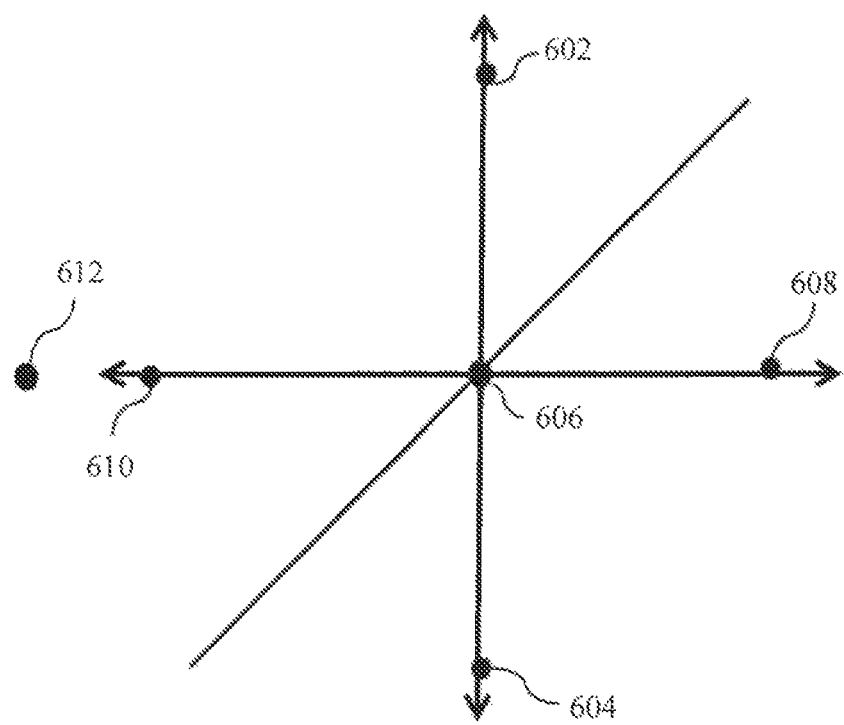

The initial water supply flow started at 70 GPM, and was maintained at that value during start-up. The system was allowed to stabilize. During the stabilization period, the feedforward function stabilized (the slope and Y-intercept were stabilized) as shown in FIG. 6, having high Y-axis endpoint 602 at +30% and low Y-axis endpoint 604 at −30%, and an average flow rate 606 at 70 GPM. The X-axis endpoints 608 and 610 were 105 GPM and 35 GPM, respectively.

The initial water supply flow was then reduced to 30 GPM within five seconds, and was maintained at 30 GPM to observe the system. The water supply inlet flowmeter instantly began providing water supply volume flow rate measurements indicating the change to 30 GPM. Over the next two seconds the controller executed the control algorithm, the feedforward output reached its negative maximum, because the current water supply volume flow rate measurement 612 was below the range of the X-axis, 35 GPM to 105 GPM. The controller sent a control signal to the actuator causing the actuator to close by 30%. This immediately cut down on the volume flow rate of the heated heating fluid 112 coming into the heat exchanger 102 which in turn prevented an overshoot in the temperature of the heated water 118 (or outlet water supply temperature).

The feedforward function subsequently was updated in periodic increments based on updated average flow rates provided by the filter. The update limitation only allowed the range of the X-axis of the feedforward function to change by a maximum of 2 GPM (at each X-axis endpoint) per increment. Accordingly, at each increment, the X-axis range was updated, by a maximum of 2 GPM (at each X-axis endpoint), encompassing the reduced water supply flow rate of 30 GPM within a few increments, and then becoming closer to and finally settling at being a range of 15 GPM to 45 GPM (namely, the reduced water supply flow rate of 30 GPM+/− half of that rate). Therefore at each increment, the reduced water supply flow rate of 30 GPM moved closer to the origin of the graph, such that (magnitude of) the feedforward output was reduced. As the feedforward output was reduced at each increment, the actuator started opening back up again which led to a slight increase of volume flow rate of the heated heating fluid 112 coming into the heat exchanger and caused a slight increase in subsequent values of the water supply outlet temperature measurements 134. However this slight incremental increase in temperature was small and slow enough for the fine-tuned feedback PID loop (e.g., associated with the second module 304 described above) to accommodate the increase such that, throughout the process, the water supply outlet temperature never increased by more than 2 degrees Fahrenheit compared to the setpoint temperature. In particular, after the flow rate of 30 GPM was encompassed by the X-axis range, the feedforward output value began to reduce at each increment, until it reached zero (0) when the X-axis range settled. Again, throughout operation, the change in the outlet temperature remained within plus or minus 2 degrees Fahrenheit of the setpoint temperature.

In view of the above description, it should be appreciated that one or more of the embodiments or implementation encompassed herein are advantageous in one more respects. First, it should be appreciated that at least some water heater embodiments encompassed herein can attain output water temperatures that are equal or closer to desired setpoint temperatures notwithstanding possible changes in the flow rate of supply water (water to be heated). Such operation is advantageously achieved by taking into account supply water flow rate information from a flow rate sensor and generating feedforward output based upon flow rate information to generate control signals for a heat source actuator position that governs the amount of heat supplied to the water heater. More particularly, such operation is advantageously achieved by generating such control signals based both upon a PID control loop taking into account sensed output temperature information and also upon such feedforward output generated based upon supply water flow rate information.

Additionally, one or more embodiments of systems and methods encompassed herein also are advantageous because those systems and methods take into account not only current supply water flow rates but also historic (e.g., average) supply water flow rates when generating feedforward output. In at least some embodiments, this is achieved by causing updates to a feedforward function to be applied in a manner in which the range of the X-axis (relating to supply water flow rate) tends to lag behind the current water supply volume flow rate when the water supply volume flow rate changes. Due to this lag associated with taking into account historic supply water flow rates, sudden fluctuations in supply water flow rates can be dampened by the control algorithm. Also as previously mentioned, subsequent to a large generated feedforward output preventing a supply water outlet temperature overshoot/undershoot due to a sudden change of supply water flow rate, the incremental update of the X-axis (e.g., X-axis endpoints) leads to small incremental reductions of the feedforward output, which in turn lead to small increments of the actuator backtracking (opening back up or closing back down), and which in turn causes incremental supply water outlet temperature increases or decreases (depending on the direction of change of supply water flow rate). However, these subsequent temperature changes are small and slow, which is why the feedback PID loop is permitted to have an opportunity to eliminate them throughout the update process without the supply water outlet temperature ever fluctuating more than plus or minus 2 degrees Fahrenheit of the setpoint temperature.

In addition, at least some embodiments of systems and methods encompassed herein are advantageous in that such systems and methods can dampen multiple flow fluctuations even if there are multiple severe flow rate changes in opposite directions of each other within a short period of time. This is achieved because the input to the feedforward function (e.g., the X values corresponding to the current supply water flow measurements 132) as well as the output of the feedforward function (e.g., the Y values) update at much faster rates (e.g., a few times per second) than the rate at which the feedforward function (e.g., the slope and Y-intercept of the feedforward function) is updated (e.g., the updating of the feedforward function lags behind). Therefore, when the X-axis range is heading towards having the new X value (new flow rate) in the origin of the graph due to a sudden supply water flow rate change, if there occurs a subsequent supply water flow rate change in the opposite direction, the X value will immediately move away from the origin again causing an immediate large feedforward output again, which causes the actuator to respond immediately and prevents another overshoot/undershoot again.

Also, another advantage associated with at least some embodiments of systems and methods encompassed herein is that, in such embodiments, the actuator's response is automatically proportional to the severity of supply water flow rate change. If the change of supply water flow rate is not particularly sudden or significant (e.g., a 10% change over one minute), the actuator's response will not be as significant or dominant as would be the case if the supply water flow rate changed in a more dramatic manner (e.g., by more than 50% over just a few seconds). Further advantageous is that, if appropriate for a particular circumstance, this response can easily be adjusted for different products by adjusting the fixed Y-axis range (feedforward output range).

Stated in another manner, control algorithms for a water heater in accordance with one or more of the embodiments encompassed herein can achieve multiple goals in a balanced manner. In particular, by taking into account both sensed output temperature by way of a PID feedback control loop and current supply water flow by way of a feedforward control loop, the output temperature of the water heater not only closely tracks a setpoint based upon the sensed temperature feedback when the flow rate of the supply water (to be heated) into the water heater is constant or substantially stable, but also rapidly adjusts a heat source actuator to accommodate circumstances in which the flow rate of the supply water suddenly changes. Additionally, by taking into account historic supply water flow rates in addition to current supply water flow rates, the control algorithm operates quickly enough to adjust the heat source actuator in a manner that allows for the output temperature of the water heater to closely track the setpoint notwithstanding the supply water flow changes, and yet also operates-incrementally over increments that are small enough to avoid excessively sudden changes to (or backtracking of) the heat source actuator when the feedforward function (slope and Y-intercept) is stabilizing around a new supply water flow rate value.

It should additionally be recognized that, even though the above description relates to water heaters such as domestic hot water (DHW) heaters employing heat exchangers and boilers that serve as heat sources for those heaters, the present disclosure is intended to encompass numerous other embodiments entailing numerous other systems and devices as well. For example, the present disclosure is also intended to encompass other products such as steam boilers to improve their control performance. Also for example, the present disclosure is intended to encompass a variety of HVAC (heating, ventilation, and air conditioning) products as well as other products beyond HVAC products.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:
1. A water heater system comprising:
a heat exchanger;
a heat source inlet fluidly connected to the heat exchanger by which heated heating fluid can be provided to the heat exchanger;
a heat source outlet fluidly connected to the heat exchanger by which cooled heating fluid can be communicated from the heat exchanger;
a water supply inlet fluidly connected to the heat exchanger by which supply water can be provided to the heat exchanger;
a water supply outlet fluidly connected to the heat exchanger by which heated water can be communicated from the heat exchanger;
a controller;
a water supply outlet temperature sensor operatively connected to the controller and configured to provide to the controller temperature measurements concerning a temperature of the heated water;
a water supply flowmeter operatively connected to the controller and configured to provide to the controller flow measurements concerning a water flow of the supply water or the heated water; and
an actuator operatively connected to the controller,
wherein the controller is configured to generate control signals based at least indirectly upon the temperature measurements and the flow measurements and to provide the control signals to the actuator to regulate a fluid flow of the heated heating fluid into the heat exchanger,
wherein the controller is configured to execute a control algorithm that generates control variables based on a temperature setpoint, the temperature measurements, and the flow measurements, wherein the control signals are based at least indirectly upon the control variables, and wherein the control signals provided to the actuator regulate the fluid flow of the heated heating fluid into the heat exchanger by causing the actuator to open or close by one or more amounts,
wherein the control algorithm comprises a first component including a first feedforward function in accordance with which first feedforward output values can be calculated based at least partly on the flow measurements, the first feedforward output values being included among the control variables, and
wherein the first feedforward function is configured so that a first feedforward output range between maximum positive and negative feedforward output values that can be calculated in accordance with the first feedforward function corresponds to less than a full positional range of the actuator.

2. The water heater system of claim 1, wherein the actuator is associated with a bypass link that is fluidly connected to the heat source inlet and the heat source outlet, and wherein the actuator causes at least a portion of the heating fluid to flow from the heat source inlet to the heat source outlet by way of the bypass link instead of into the heat exchanger when the actuator is closed fully or partly.

3. The water heater system of claim 2, wherein the flowmeter is mounted in relation to the water supply inlet and the flow measurements concern the water flow of the supply water, wherein the heat source inlet is a boiler inlet by way of which the heated heating fluid can be provided to the heat exchanger after being heated by a boiler, and wherein the heat source outlet is a boiler outlet by way of which the cooled heating fluid can be communicated from the heat exchanger for return to the boiler.

4. The water heater system of claim 1, wherein the first feedforward function is a first linear function defining correspondences between at least some of the flow measurements within a first X-axis range extending between first and second X-axis endpoints and at least some of the first feedforward output values within a first Y-axis range extending between the maximum positive and negative feedforward output values.

5. The water heater system of claim 4, wherein the first X-axis endpoint equals or substantially equals one-hundred and fifty percent (150%) of an average flow rate of the supply water, and the second X-axis endpoint equals or substantially equals fifty percent (50%) of the average flow rate of the supply water, and wherein the maximum positive and negative feedforward output values are fixed.

6. The water heater system of claim 4, wherein the controller includes a filter module configured to perform a first update of the first feedforward function to determine at least in part a first updated feedforward function if an average flow determined based upon one or more of the flow values varies over time.

7. The water heater system of claim 6, wherein the first updated feedforward function is a first updated linear function with one or both of a first updated slope and a first updated Y-intercept, and wherein the first updated feedforward function defines first updated correspondences between at least some of the flow measurements within a first updated X-axis range extending between third and fourth X-axis endpoints and at least some of the feedforward output values either within the Y-axis range or a first updated Y-axis range.

8. The water heater system of claim 7, wherein the controller also includes an update limiter module and the first updated feedforward function is determined based upon a first operation of the filter module and a second operation of the update limiter module, and
wherein the update limiter module is configured to determine the third X-axis endpoint of the first updated X-axis range as being at a first limit location that differs from the first X-axis endpoint by a first limit amount if the filter module determines that the third X-axis endpoint of the first updated X-axis range should be at a first alternate location that differs from the first X-axis endpoint by more than the first limit amount.

9. The water heater system of claim 6, wherein the controller is configured to perform repeated updates including the first update, wherein the controller is configured to perform the repeated updates periodically at a first rate that is slower than a second rate at which the first feedforward output values are determined based upon the flow measurements, so that an updating of one or both of a slope and a Y-intercept of the first feedforward function or the first updated feedforward function lags behind determinations of the first feedforward output values based upon the flow measurements, which are performed in at least a substantially continuous manner.

10. The water heater system of claim 1, wherein the control algorithm comprises a second component including a feedback function in accordance with which feedback output values can be calculated based on the temperature setpoint and the outlet temperature measurements, the feedback output values being included among the control variables.

11. The water heater system of claim 10, wherein the feedback function includes a proportional-integral-derivative (PID) equation, and wherein the control algorithm is configured so that variations of the feedback output values can produce greater changes in the control signals than variations in the feedforward output values.

12. A method of operating a water heater system using a controller executing a control algorithm, the method comprising:
receiving and storing a temperature setpoint;
receiving a first flow measurement from a water supply flowmeter;
receiving a first temperature measurement from a water supply outlet temperature sensor;
executing a feedback function and generating a feedback output value based at least in part upon the temperature setpoint and the first temperature measurement;
executing a first feedforward function and generating a feedforward output value based at least in part upon the first flow measurement;
combining the feedforward output value and the feedback output value to generate a control signal;
adjusting an actuator based at least indirectly upon the control signal so as to adjust a heat source water flow into a heat exchanger of the water heater system;
determining whether an update cycle time has elapsed; and
generating an updated feedforward function if the update cycle time has elapsed,
wherein the generating of the updated feedforward function is repeated periodically at a first rate so that additional updated feedforward functions are additionally generated, wherein the generating of the feedforward output value is repeated periodically at a second rate so that additional feedforward output values are additionally generated, and wherein the first rate is slower than the second rate and the additional feedforward output values are generated in a substantially continuous manner.

13. The method of claim 12, wherein the water supply flowmeter is associated with a water supply inlet and the flow measurement concerns a flow rate of supply water into the heat exchanger,
wherein the feedback function includes a proportional-integral-derivative (PID) equation,
wherein the first feedforward function includes a linear function having first and second X-axis endpoints, and
wherein the first feedforward function has a Y-axis representing a feedforward output range having first and second Y-axis endpoints that respectively correspond to maximum positive and negative feedforward output values.

14. The method of claim 12, wherein the first feedforward function includes a linear function having first and second X-axis endpoints, and wherein the generating of the updated feedforward function additionally includes:
entering the first flow measurement into a First In First Out (FIFO) filter that stores a plurality of additional flow measurements, and calculating an average flow rate based on the first and additional flow measurements;
dividing the average flow rate by 2 to obtain a 50% value of the average flow rate;
obtaining third and fourth X-axis endpoints respectively by adding the 50% value to and subtracting the 50% value from the average flow rate, respectively;
using an update limiter to determine a first difference between the third X-axis endpoint and the first X-axis endpoint, and between the fourth X-axis endpoint and the second X-axis endpoint; and either:

a) generating the updated feedforward function based on the third and fourth X-axis endpoints when each of the first difference and second difference is less than or equal to a limit amount; or
b) generating the updated feedforward function based on an additional X-axis endpoint when the first difference or the second difference is greater than the limit amount, wherein the additional X-axis endpoint differs from either the first X-axis endpoint or the second X-axis endpoint by way of the limit amount.

15. The method of claim 12, further comprising:
replacing the first feedforward function with the updated feedforward function, wherein the limit amount is equal or substantially equal to 2 GPM, and the update cycle time is equal or substantially equal to 15 seconds.

16. A water heater system comprising:
a heat exchanger;
a heat source inlet fluidly connected to the heat exchanger by which heated heating fluid can be provided to the heat exchanger;
a heat source outlet fluidly connected to the heat exchanger by which cooled heating fluid can be communicated from the heat exchanger;
a water supply inlet fluidly connected to the heat exchanger by which supply water can be provided to the heat exchanger;
a water supply outlet fluidly connected to the heat exchanger by which heated water can be communicated from the heat exchanger;
a controller;
a water supply outlet temperature sensor operatively connected to the controller and configured to provide to the controller temperature measurements concerning a temperature of the heated water;
a water supply flowmeter operatively connected to the controller and configured to provide to the controller flow measurements concerning a water flow of the supply water or the heated water; and
an actuator operatively connected to the controller,
wherein the controller is configured to generate control signals based at least indirectly upon the temperature measurements and the flow measurements and to provide the control signals to the actuator to regulate a fluid flow of the heated heating fluid into the heat exchanger,
wherein the actuator is associated with a bypass link that is fluidly connected to the heat source inlet and the heat source outlet, and wherein the actuator causes at least a portion of the heating fluid to flow from the heat source inlet to the heat source outlet by way of the bypass link instead of into the heat exchanger when the actuator is closed fully or partly,
wherein the controller is configured to execute a control algorithm that generates control variables based on a temperature setpoint, the temperature measurements, and the flow measurements, wherein the control signals are based at least indirectly upon the control variables, and wherein the control signals provided to the actuator regulate the fluid flow of the heated heating fluid into the heat exchanger by causing the actuator to open or close by one or more amounts,
wherein the control algorithm comprises a first component including a first feedforward function in accordance with which first feedforward output values can be calculated based at least partly on the flow measurements, the first feedforward output values being included among the control variables, and
wherein the controller is additionally configured to perform a first update of the first feedforward function to determine at least in part an updated feedforward function, and to replace the first feedforward function with the updated feedforward function.

17. The water heater system of claim 16, wherein the flowmeter is mounted in relation to the water supply inlet and the flow measurements concern the water flow of the supply water, wherein the heat source inlet is a boiler inlet by way of which the heated heating fluid can be provided to the heat exchanger after being heated by a boiler, and wherein the heat source outlet is a boiler outlet by way of which the cooled heating fluid can be communicated from the heat exchanger for return to the boiler.

18. The water heater system of claim 16, wherein the first feedforward function is configured so that a first feedforward output range between maximum positive and negative feedforward output values that can be calculated in accordance with the first feedforward function corresponds to less than a full positional range of the actuator.

19. The water heater system of claim 16, wherein the control algorithm comprises a second component including a feedback function in accordance with which feedback output values can be calculated based on the temperature setpoint and the outlet temperature measurements, the feedback output values being included among the control variables.

20. The water heater system of claim 19, wherein the feedback function includes a proportional-integral-derivative (PID) equation, and wherein the control algorithm is configured so that variations of the feedback output values can produce greater changes in the control signals than variations in the feedforward output values.

21. The water heater system of claim 16, wherein the controller is configured to generate additional control signals based at least in part upon additional feedforward output values generated based at least in part upon additional flow measurements in accordance with the updated feedforward function.

22. The water heater system of claim 21, wherein the controller includes a filter module that is configured to perform the first update of the first feedforward function to determine at least in part the updated feedforward function if an average flow determined based upon one or more of the flow values varies over time.

* * * * *